United States Patent [19]

Kim

[11] Patent Number: 4,662,092

[45] Date of Patent: May 5, 1987

[54] PICTURE FRAME CONSTRUCTION

[76] Inventor: Han K. Kim, 83-45 Vietor Ave., #3A, Elmhurst, N.Y. 11373

[21] Appl. No.: 761,554

[22] Filed: Aug. 1, 1985

[51] Int. Cl.[4] .............................................. G09F 1/12
[52] U.S. Cl. ....................................... 40/155; 40/152; 40/152.1; 403/402; 403/403; 403/404
[58] Field of Search ...................... 40/152, 155, 152.1; 403/402, 403, 404

[56] References Cited

U.S. PATENT DOCUMENTS

| 1,913,000 | 6/1933 | Woller | |
|---|---|---|---|
| 3,534,490 | 10/1970 | Herbert | 40/152 |
| 3,965,601 | 6/1976 | Nielsem | 40/152 |
| 4,122,617 | 10/1975 | Nielsen | 40/155 |
| 4,124,323 | 11/1978 | Freeman | 403/402 |
| 4,136,470 | 1/1979 | Barz | 40/152 |
| 4,356,648 | 11/1982 | Beauliue | 40/152 |
| 4,403,434 | 9/1983 | Jenkins | 40/152 |
| 4,477,990 | 10/1984 | Buchanan | 40/155 |

Primary Examiner—Gene Mancene
Assistant Examiner—Wenceslao J. Contreras

[57] ABSTRACT

A metallic picture frame construction including corner frame elements which connect rectilinear segments in an attractive manner in which the interconnecting screws are concealed from view. The corner elements surround the ends of the rectilinear segments, and they are maintained in engagement solely by compressive forces exerted by the screws making unnecessary the drilling of holes in the rectilinear members. The invention has application to wood rectilinear segments as well, using wood screws which penetrate the corner elements and the rectilinear segments.

7 Claims, 35 Drawing Figures

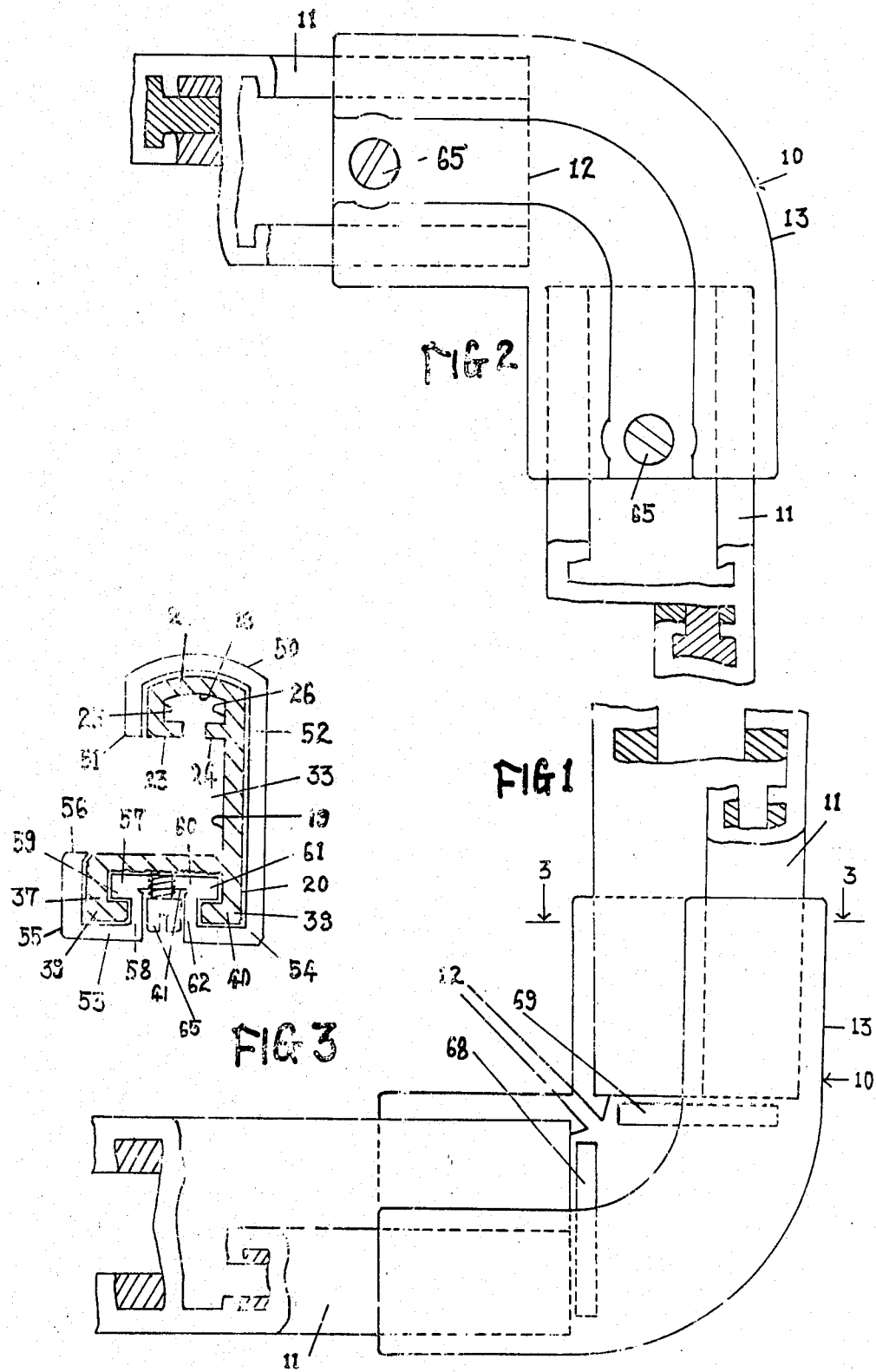

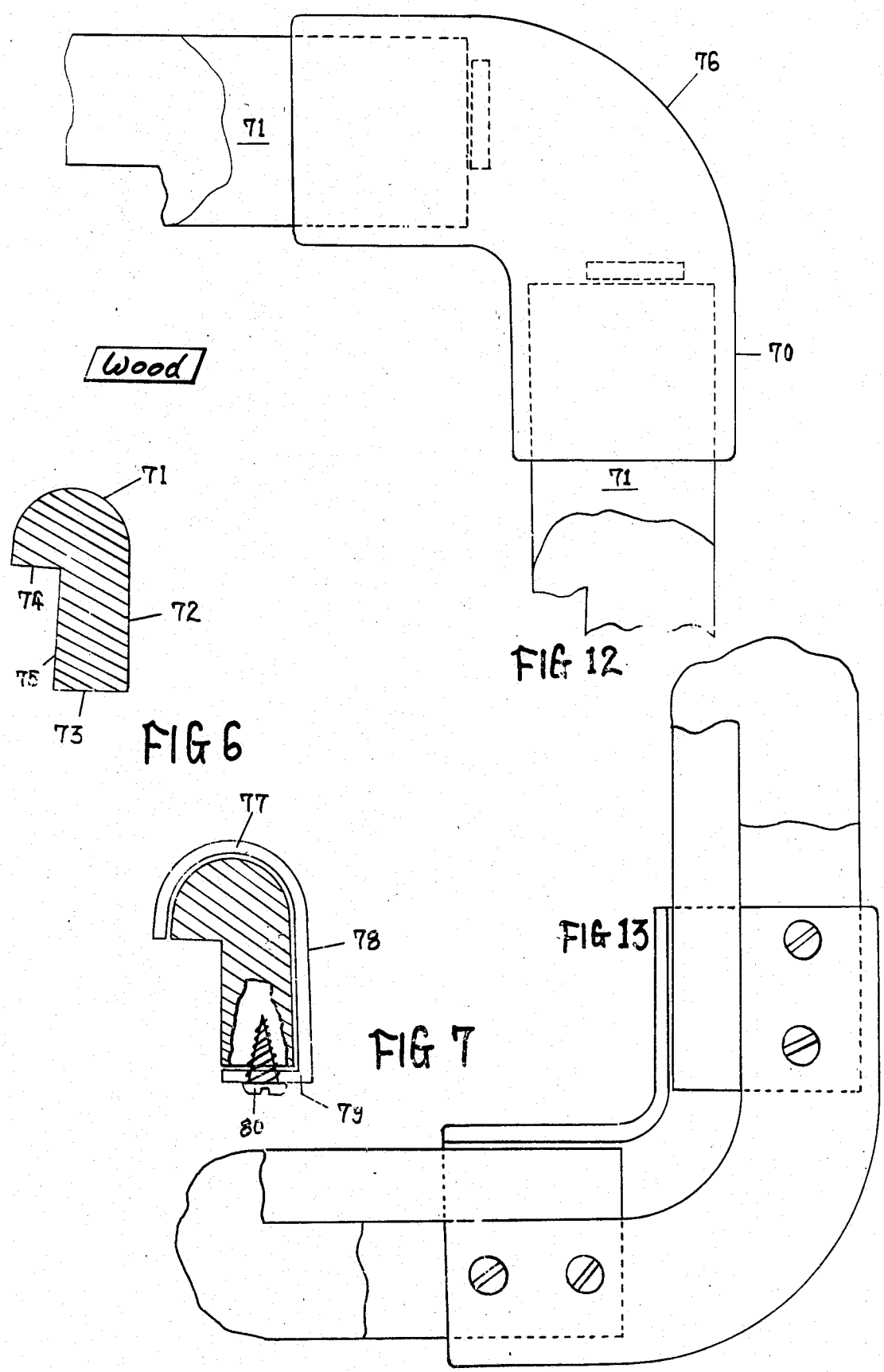

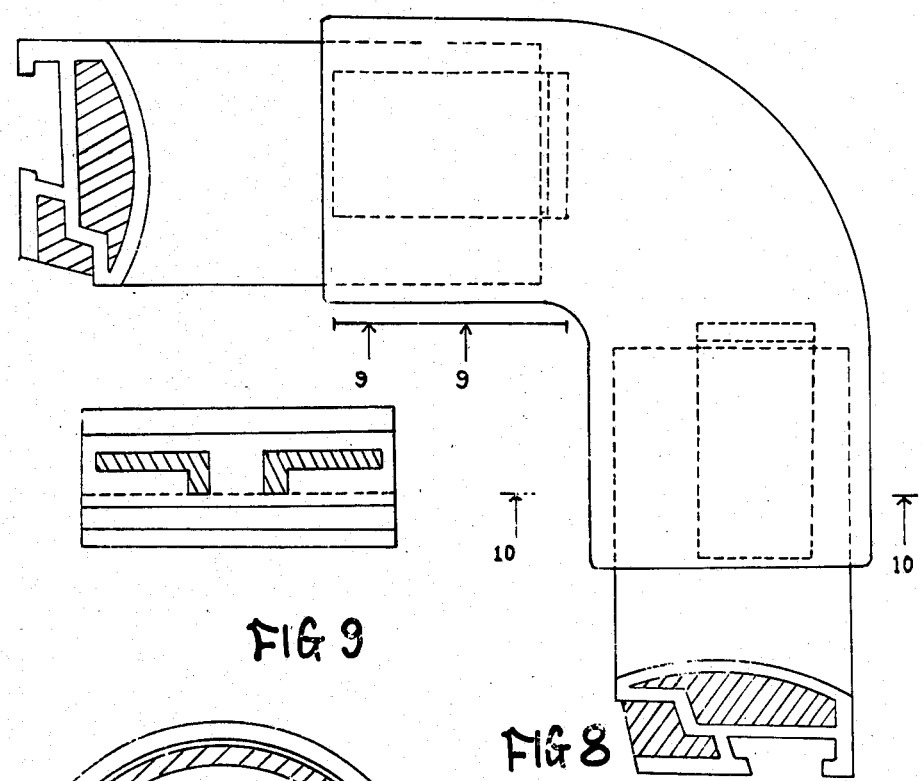
FIG 9
FIG 8
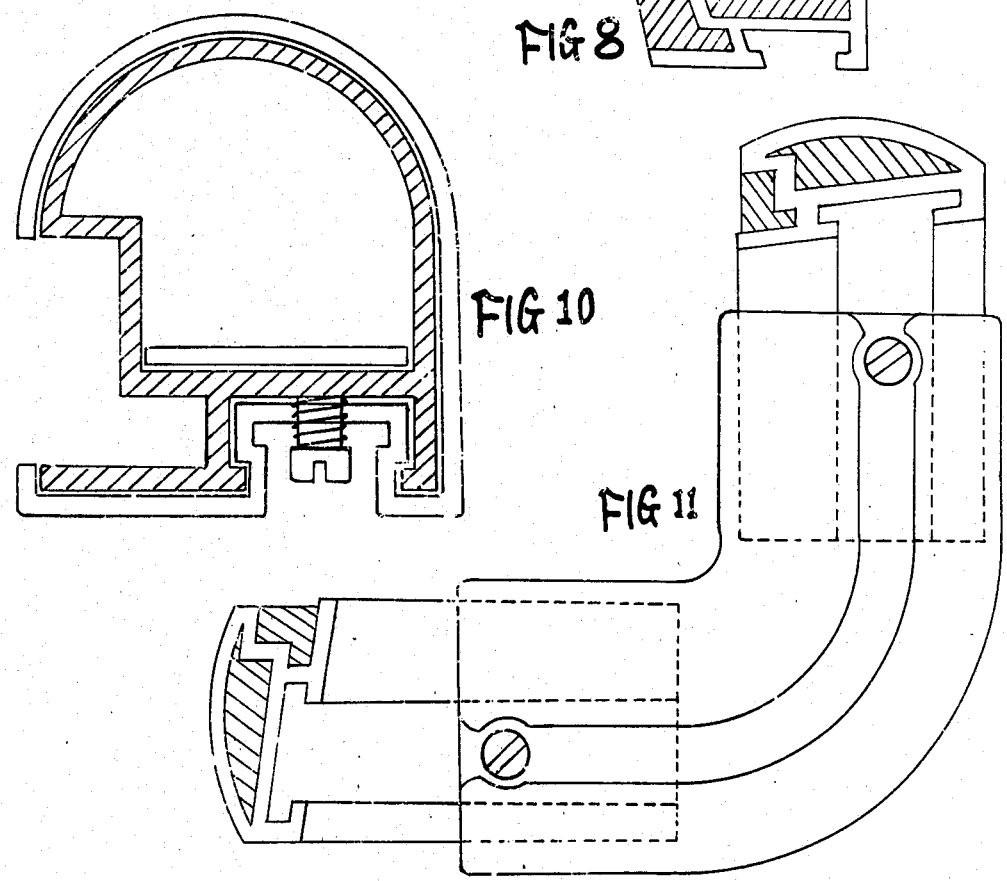
FIG 10
FIG 11

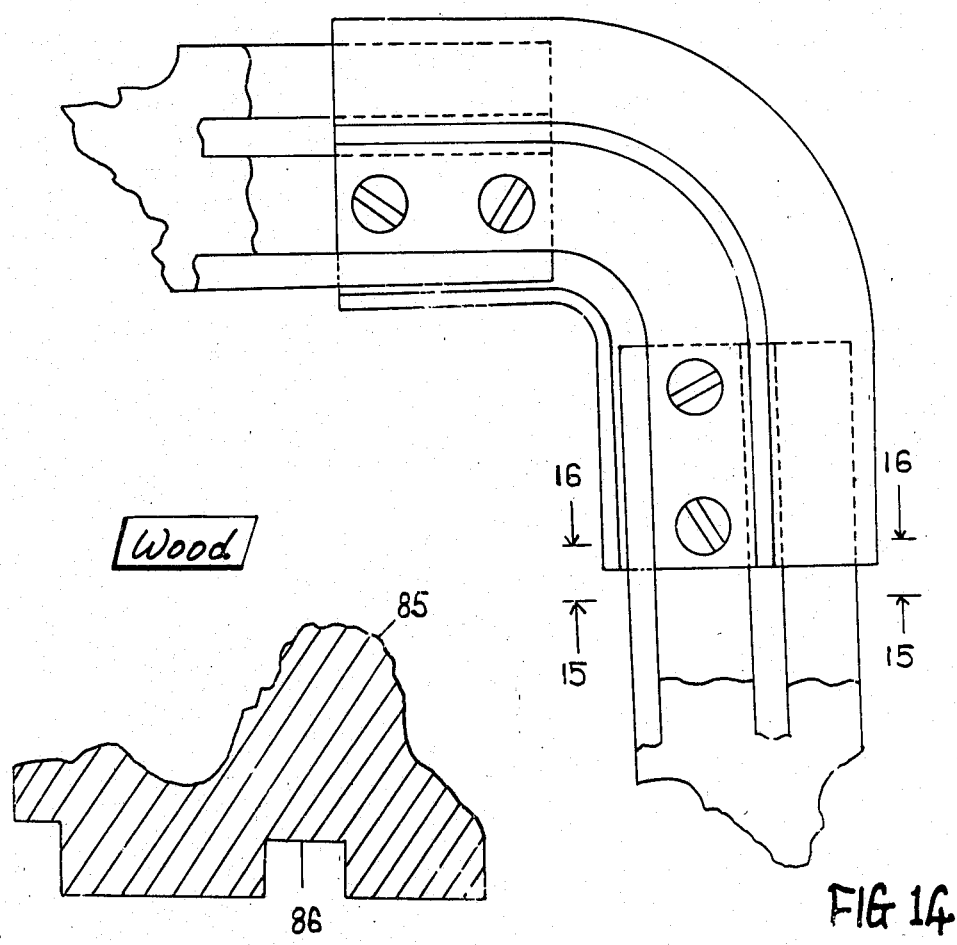
FIG 14
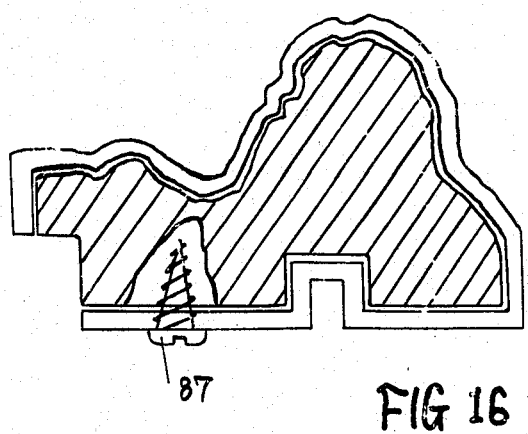
FIG 15
FIG 16

PICTURE FRAME CONSTRUCTION

BACKGROUND OF THE INVENTION

This invention relates generally to the field of picture frame construction, and more particularly to an improved corner interconnecting means suitable for use with both wood and metallic rectilinear frame segments which make assembly of the frame possible by those possessing ordinary skills in using ordinary tools.

While the classic wood frame continues to have substantial popularity, in recent years there has been a growing acceptance of frames which are made of extruded metallic side elements interconnected at the four corners thereof by triangularly shaped brackets which fit into corresponding recesses in the ends of the extruded members. These brackets span the miter joint and lock the metal members together, either by force fitting or the use of screws which penetrate the brackets and the rectilinear members.

This construction precludes the forming of rounded corners, as distinguished from rectangular ones, and, in many, if not most, cases, it is necessary to drill holes in the ends of the rectilinear members to accommodate the screw interconnection. Since the bracket itself is concealed from view, no ornamental embellishments can be provided at the corners, and the miter joint remains exposed.

SUMMARY OF THE INVENTION

Briefly stated, the invention contemplates the provision of improved corner frame elements which replace the rectangularly shaped brackets referred to above, which, instead of being inserted into recesses in the rectilinear members surround the ends of the rectilinear members by engaging the outer surfaces thereof, and thus eliminate the need for a miter joint and completely conceal the ends of the rectilinear segments. Because substantially the entire outer surfaces of the rectilinear segments are engaged, the frame has substantial resistance to flexing or bending, and it is physically impossible to assemble the elements of the frame in an improper manner. Further, the outer surface of the corner members may be suitably decorated in a desired motif to permit a variety of decorative appearances without modification of the rectilinear segments, and may be used with wood frames as well.

A BRIEF DESCRIPTION OF THE DRAWINGS

In the drawings, to which reference will be made in the specification, similar reference characters have been employed to designate corresponding parts throughout the several views.

FIG. 1 is a fragmentary view in elevation of an embodiment of the invention.

FIG. 2 is a similar view in elevation thereof, showing the side opposite that seen in FIG. 1.

FIG. 3 is a transverse sectional view thereof as seen from the plane 3—3 in FIG. 1.

FIG. 6 is a cross-sectional view of a second embodiment of of the invention employing wood frame segments.

FIG. 7 is a similar cross-sectional view showing a corner element comprising the second embodiment in engaged condition.

FIG. 8 is a fragmentary view in elevation of a third embodiment of the invention.

FIG. 9 is a transverse sectional view thereof as seen from the plane 9—9 in FIG. 8.

FIG. 10 is an enlarged transverse sectional view seen from the plane 10—10 in FIG. 8.

FIG. 11 is a fragmentary view in elevation showing the side opposite that seen in FIG. 8.

FIG. 12 is a fragmentary view in elevation of the second embodiment in assembled condition.

FIG. 13 is a fragmentary view in elevation of the second embodiment showing the side opposite that seen in FIG. 12.

FIG. 14 is a fragmentary view in elevation showing a fourth embodiment of the invention.

FIG. 15 is an enlarged transverse sectional view as seen from the plane 15—15 in FIG. 14.

FIG. 16 is an enlarged sectional view as seen from the plane 16—16 in FIG. 14.

FIGS. 17 through 25, inclusive, are sectional views corresponding to that seen in FIG. 3, showing further alternate forms of the invention using metallic frame elements.

Figure 26:
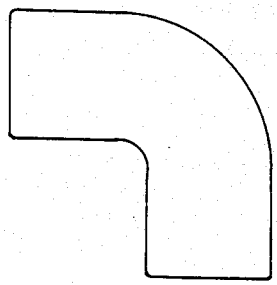
Figure 4:
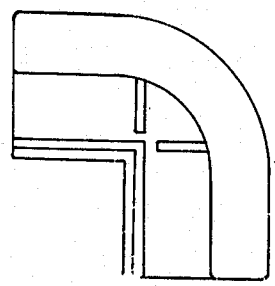
FIG. 4 is a view in elevation showing one of the corner bracket members in detached condition.

FIG. 26 is an elevational view showing the surface opposite that seen in FIG. 4.

Figure 27:
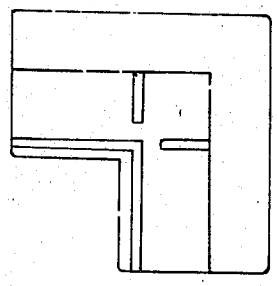

FIG. 27 is a view in elevation corresponding to that seen in FIG. 4 and showing a rectangularly shaped version thereof.

Figure 28:
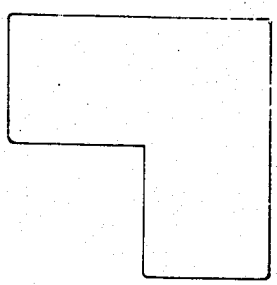

FIG. 28 is a view of the variation shown in FIG. 27, showing oppositely disposed surfaces thereof.

Figure 29:
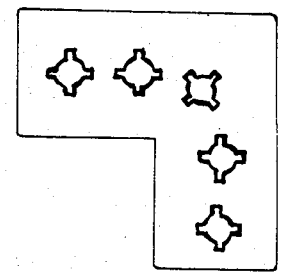

FIG. 29 is a view corresponding to that seen in FIG. 28, showing optional decorative embellishment thereon.

Figure 30:
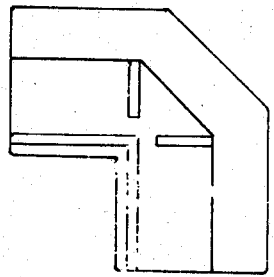

FIG. 30 is a further variation corresponding to that seen in FIG. 4 and showing a polygonally shaped periphery.

Figure 31:
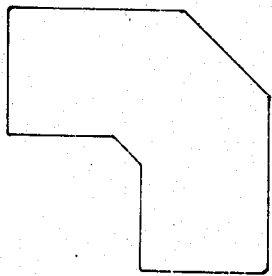

FIG. 31 is a view corresponding to that seen in FIG. 30, and showing opposite sides thereof.

Figure 32:
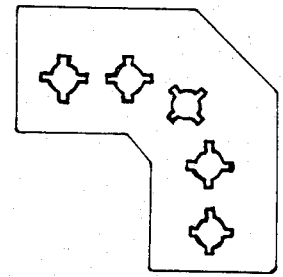

FIG. 32 is a view in elevation corresponding to that seen in FIG. 31, with additional surface embellishment thereon.

Figure 33:
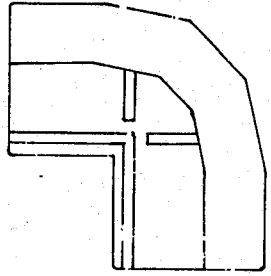

FIG. 33 is a view in elevation showing a still further variation of polygonal periphery.

Figure 34:
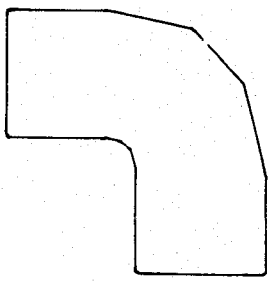

FIG. 34 is a view in elevation showing the surfaces opposite that seen in FIG. 33.

Figure 35:
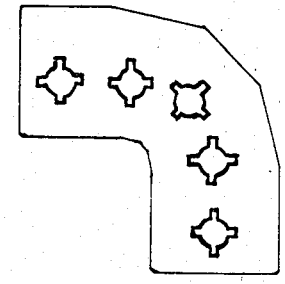
Figure 17:
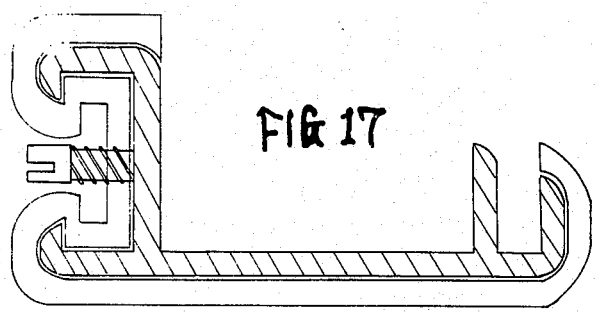
Figure 18:
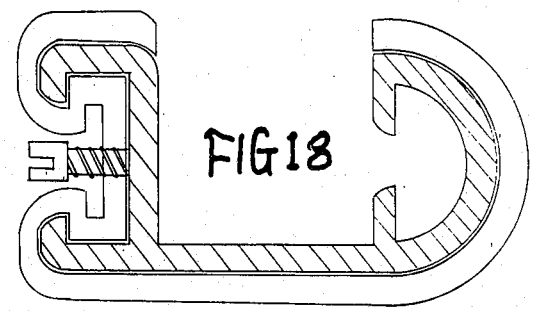
Figure 19:
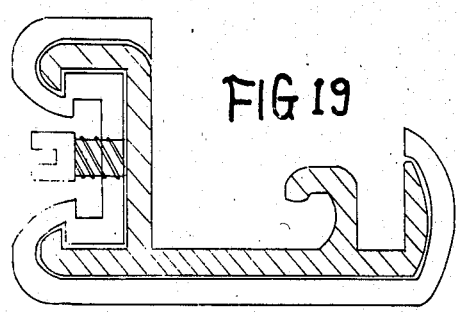
Figure 20:
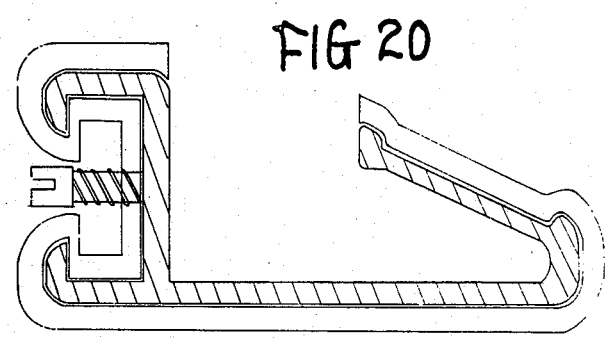
Figure 21:
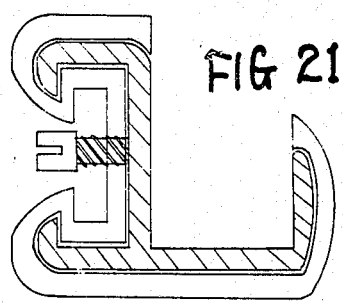
Figure 22:
Figure 23:
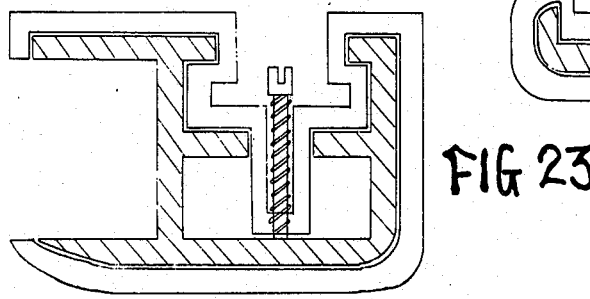
Figure 25:
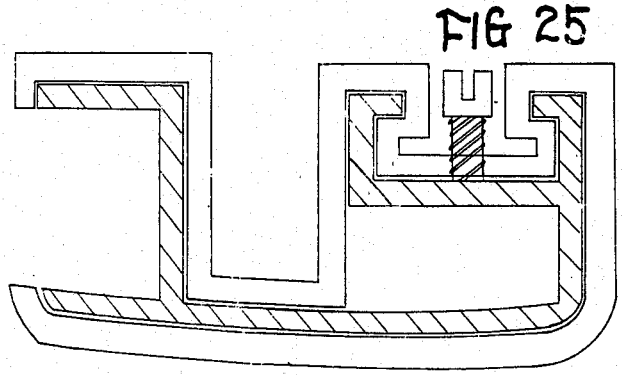
Figure 24:
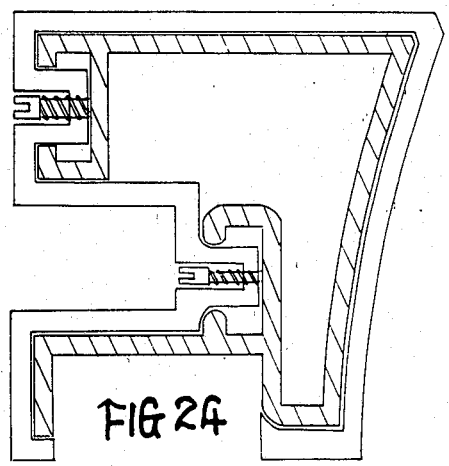

FIG. 35 is a view in elevation corresponding to that seen in FIG. 34 with additional surface embellishment.

DETAILED DESCRIPTION OF THE DISCLOSED EMBODIMENT

In accordance with the invention, a frame construction, generally indicated by reference character 10, comprises broadly a plurality of rectilinear segments 11, the end portions 12 of which are joined by a plurality of corner elements 13.

The rectilinear segments 11 define the rectangular periphery of a completed frame, and may be of extruded metallic or synthetic resinous construction, or wood. In the case of wood construction, the below described recesses will be formed by routing operations known in the carpentry art. It will be understood that the particular cross-sectional configuration shown in FIG. 3 in the drawing is one of many known configurations, all of which configurations are characterized in the provision of a recess adapted to engage and border the side surfaces of a displayed picture, along with the usual glass cover, mat, and backing. A second recess is provided which accommodates an angularly shaped bracket which fits within both of two mitered sections forming a corner joint, as exemplified in U.S. Pat. No. 4,124,323 granted to Freeman, Nov. 7, 1978.

Thus, each of the segments 11 may include an outer curved wall portion 18, a side wall portion 19, and a base wall portion 20. The outer wall portion 18 includes first and second flanges 23 and 24, laterally extending parts 25 and 26, and a curved outer wall 27. The side wall segment 19 is of generally planar configuration, and, with the portions 18 and 20 defines a first recess 33 for the reception of the displayed picture.

The base wall portion 20 includes a forward wall 36, side walls 37 and 38, as well as rear walls 39 and 40 which define a generally flat channel 41.

The corner elements may be formed as metallic die castings or synthetic resinous moldings, and are adapted to replace the conventional corner bracket which secures a mitered joint normally formed at the corners of a prior art frame. The corner elements 13 are adapted to surround the end portions 12 of each of the rectilinear segments 11, and thus, the necessity of forming a miter joint is eliminated.

As best seen in FIG. 3, each element 13 has a cross-sectional configuration which corresponds to that of the segments 11, so as to be slidably engageable therewith, and secured in position by set screws. Thus, in the particular configuration shown in the drawings, the elements 13 include an outer curved wall 50 having a terminal flange 51 along a free edge thereof, a side wall 52, a pair of rear walls 53 and 54, an inner side wall 55 having a terminal flange or lip 56, and a socket engaging portion 57 including interconnected walls 58, 59, 60, 61 and 62. The wall 60 is drilled and tapped for one or more set screws 65 which, when tightened, bear against the inner surface of a pair of the channel 41 which forms a second recess in the segments 11.

Figure 5:
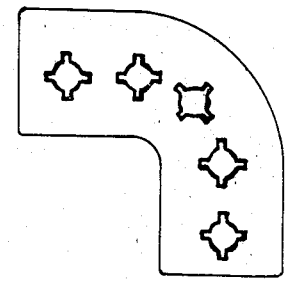
FIG. 5 is a similar view of a corner bracket showing the application of decorative embellishment.

Assembly of the device will be apparent from a consideration of FIGS. 1 and 2. The end portions 12 of the segments 11 are inserted into the open ends of the corner elements 13 until they abut stop members 68 and 69, following which the set screws 65 are tightened, this operation being performed after the displayed picture (not shown) is positioned within the first recess 33. Because the corner members completely surround the outer surface of the side segments, this interconnection results in a joint of much greater strength than is obtained where engagement is by way of angularly disposed brackets entering the channel 41 without their support. In addition, the necessity of forming a mitered joint is eliminated, and, where a rounded corner appearance is desired, this is obtained without difficulty. A square corner can also be obtained by merely providing sufficient material in the corner bracket. In addition, as seen in FIG. 5, surface ornamentation may be provided to enhance the overall appearance of the frame, which is not possible in conventional construction because the interconnecting bracket is completely concealed.

Turning now to the second embodiment of the invention illustrated in FIGS. 6 and 7, this embodiment employs wood side segments rather than matallic ones, and does not employ a second channel which is common to metallic side segments.

Thus, the second embodiment, generally indicated by reference character 70, employs side segments bounded by a curved outer surface 71, a generally planar outer surface 72, a rear surface 73, as well as rabbet surfaces 74 and 75, which defines the recess accommodating the displayed picture. The corner element 76 is of metal or a synthetic resinous material, and includes a curved outer portion 77, a planar side portion 78, and a planar rear portion 79, which accommodates one or more wood screws 80 engaging the ends of the side segments.

The embodiment shown in FIG. 15 is a composite structure permitting a highly decorated outer surface, and is often made either as a cast metal piece, rather than extruded, or, in some cases, as a board member having an outer surface portion of gesso or the like. Side segments of this type have an ornamented surface 85 which is not smooth, as well as a planar inner surface having a rectangular recess 86. However, where the side segments are made of wood, the wood screw 87 is engaged in exactly the same manner as in the second embodiment.

In each embodiment, the essence of my invention is the formation of corner elements which are capable of engaging the outer surfaces of the side segments at the end portions thereof with sufficient purchase as to afford substantial mechanical strength and rigidity. In most cases, a pair of screws at each corner will suffice to obtain this end. In each case, the usual miter joint is eliminated. In the case of metallic structure, all of the necessary screws can be drilled and tapped at the factory. In the case of wood construction, only simple pilot hole need be formed in the wood members to accommodate wood screws installed by the frame maker. I wish it to be understood that I do not consider the invention to be limited to the precise details of structure shown and set forth in this specification, for obvious modifications will occur to those skilled in the art to which the invention pertains.

I claim:

1. Improved picture frame construction comprising: a plurality of rectilinear side segments defining the periphery of a rectangular frame, and a plurality of corner elements interconnecting said side segments at the ends thereof; said side segments being of a given cross-sectional configuration, and defining a longitudinal recess for the accommodation of a side surface of a displayed picture; said side surfaces of said longitudinal segments defining a substantially continuous surface bordering said recess; said corner elements having a cross sectional configuration corresponding to that of said given cross-sectional configuration of said side segments, and slidably engaging the outer surfaces of said side elements while leaving said recess exposed; and threaded means penetrating said corner elements and engaging said side segments in areas spaced from said recess to maintain said segments and said corner elements in mutually interconnected condition.

2. Picture frame construction in accordance with claim 1, characterized in said side segments being of wood, and said threaded means comprising wood screws penetrating both said corner elements and said side segments.

3. Improved picture frame construction comprising: a plurality of rectilinear side segments defining the periphery of a rectangular frame, and a plurality of corner elements interconnecting said side segments at the ends thereof; said side segments being of a given cross-sectional configuration, and defining a first longitudinal recess for the accommodation of a side surface of a displayed picture, and a second longitudinal recess for the reception of means for interconnecting said side segments at the ends thereof, said side segments defining a substantially continuous outer surface bordering said first and second recesses; said corner elements having a cross-sectional configuration corresponding to that of said given cross-sectional configuration of said side segments, and slidably engaging the outwardly exposed surfaces of said side segments, including those defining said second recess, while leaving exposed said first recess; and set screw means penetrating said corner elements and bearing upon said side segments at a surface of said second recess.

4. Picture frame construction in accordance with claim 1, further characterized in said side segments being in the form of metallic extrusions.

5. Picture frame construction in accordance with claim 1, further characterized in said side segments being in the form of synthetic resinous extrusions.

6. Picture frame construction in accordance with claim 1, further characterized in said corner elements being in the form of die castings of metallic material.

7. Picture frame construction in accordance with claim 1, further characterized in said corner frame elements being in the form of synthetic resinous moldings.

* * * * *